(12) United States Patent
Hoover

(10) Patent No.: US 12,134,476 B1
(45) Date of Patent: Nov. 5, 2024

(54) FLIGHT CONTROLLER INGRESS AND EGRESS SYSTEM

(71) Applicant: AMI Industries, Inc., Colorado Springs, CO (US)

(72) Inventor: Douglas E. Hoover, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 18/231,014

(22) Filed: Aug. 7, 2023

(51) Int. Cl.
B64D 11/06 (2006.01)

(52) U.S. Cl.
CPC ...... B64D 11/0639 (2014.12); B64D 11/0648 (2014.12)

(58) Field of Classification Search
CPC .. B64D 11/0639; B64D 11/0648; B64C 13/06
See application file for complete search history.

(56) References Cited

U.S. PATENT DOCUMENTS

| 3,580,636 | A | 5/1971 | Setto |
| 4,763,860 | A | 8/1988 | Vauvelle et al. |
| 5,137,234 | A | 8/1992 | Sakurai |
| 5,156,363 | A | 10/1992 | Cizewski et al. |
| 8,028,960 | B2 | 10/2011 | Wassenhove et al. |
| 8,052,097 | B2 | 11/2011 | Rollet |
| 8,812,177 | B2 | 8/2014 | Yates et al. |
| 8,991,770 | B2 | 3/2015 | Bandera |
| 9,056,675 | B2 | 6/2015 | Yates et al. |
| 9,452,839 | B2 * | 9/2016 | Chatrenet ........ B64D 11/00153 |
| 9,764,830 | B2 | 9/2017 | Yates et al. |
| 9,908,614 | B2 | 3/2018 | Cherepinsky et al. |
| 10,059,439 | B2 | 8/2018 | Gillett et al. |
| 10,464,662 | B2 | 11/2019 | Mercer et al. |
| 11,117,653 | B2 | 9/2021 | Covington et al. |
| 11,167,837 | B2 | 11/2021 | Taylor |
| 11,459,109 | B2 | 10/2022 | Hoover et al. |
| 11,472,535 | B2 | 10/2022 | Worsham et al. |
| 11,498,685 | B2 | 11/2022 | Hoover et al. |
| 11,524,786 | B2 | 12/2022 | Hoover |
| 11,535,373 | B2 | 12/2022 | Johnson |
| 11,577,839 | B2 | 2/2023 | Hoover |
| 2006/0000656 | A1 | 1/2006 | Bisick et al. |
| 2008/0093908 | A1* | 4/2008 | Cooley .................. B60N 2/753 297/411.3 |
| 2010/0171350 | A1* | 7/2010 | Large ..................... B60N 3/002 297/217.3 |
| 2011/0101176 | A1 | 5/2011 | Núñez et al. |
| 2011/0163206 | A1* | 7/2011 | Bandera .................. B64C 13/06 244/234 |

(Continued)

FOREIGN PATENT DOCUMENTS

CN 202257277 U 5/2012

*Primary Examiner* — Joshua J Michener
*Assistant Examiner* — Cindi M Curry
(74) *Attorney, Agent, or Firm* — Suiter Swantz IP

(57) ABSTRACT

A flight controller ingress and egress system is implemented using an assembly. The assembly pivots an outboard flight controller. The pivoting of the outboard flight controller creates a space for the pilot to ingress and egress through the aircraft door more easily. The assembly improves pilot safety and convenience when during ingress and egress from the aircraft. The assembly includes a seat bracket, a pivot bracket, a carriage, and a link.

15 Claims, 20 Drawing Sheets

(56) References Cited

U.S. PATENT DOCUMENTS

2014/0091604 A1* 4/2014 Chatrenet .............. B64D 43/00
  297/217.3
2014/0138492 A1 5/2014 Staagen
2016/0229539 A1* 8/2016 Ferguson ........... B64D 11/0696

* cited by examiner

FLIGHT CONTROLLER INGRESS AND EGRESS SYSTEM

TECHNICAL FIELD

The present invention generally relates to seats and more specifically to seats with moveable flight controllers.

BACKGROUND

It is necessary to be able to get in & out of a helicopter/rotorcraft cockpit easily without being encumbered by the outboard flight controller that is attached to the pilot's seat. The outboard flight controller can be a large piece of equipment that can partially block or hinder the pilot's ability to get past the outboard flight controller in order to occupy the seat. Furthermore, the outboard flight controller includes sensitive instrumentation that could be struck or jolted by the pilot while entering or exiting the cockpit.

Legacy designs cause the outboard flight controller to swing upwards on a 4-bar linkage system. The 4-bar linkage system lifts the flight controller upward and rearward. The upward motion is not good in that the upward motion can drive the flight controller into other equipment mounted to the seat, particularly with changes in wing armor adjacent to the seat. Therefore, it would be advantageous to provide a device, system, and method that cures the shortcomings described above.

SUMMARY

An assembly is described. The assembly includes a seat bracket. The assembly includes a pivot bracket. The pivot bracket is coupled to the seat bracket by a revolute joint. The pivot bracket is configured to rotate relative to the seat bracket about the revolute joint. The revolute joint includes a vertical axis of rotation. The assembly includes a carriage comprising a base portion. The carriage is coupled to the pivot bracket by a prismatic joint. The carriage is configured to translate relative to the pivot bracket along the prismatic joint. The assembly includes a link. The link is pivotably coupled between the seat bracket and the carriage. Rotation of the pivot bracket about the revolute joint simultaneously causes rotation of the carriage relative to the seat bracket and translation of the carriage along the prismatic joint.

The assembly includes a lock assembly. The lock assembly is configured to lock the pivot bracket to the seat bracket. Locking the pivot bracket to the seat bracket prevents rotation of the pivot bracket about the revolute joint and the translation of the carriage along the prismatic joint.

The lock assembly is coupled to the pivot bracket. The lock assembly rotates with the pivot bracket as the pivot bracket rotates about the revolute joint.

The lock assembly includes an end fitting and a pin. The end fitting is coupled to the pivot bracket. The pin is configured to translate relative to the end fitting. The lock assembly unlocks the pivot bracket from the seat bracket in response to translating the pin downwards.

The assembly includes a cable and a control lever. The cable is coupled between the control lever and the lock assembly. Pulling on the control lever creates tension in the cable causing the pin to translate downwards. The end fitting causes the pin to translate upwards relative to the seat bracket when the tension in the cable is removed.

The assembly is configurable between an in-flight configuration and an ingress/egress configuration.

The pivot bracket and the carriage are at a 0-degree angle relative to the seat bracket when the assembly is configured in the in-flight configuration. The carriage is at a rearmost position relative to the pivot bracket when the assembly is configured in the in-flight configuration. The pivot bracket and the carriage are at a 90-degree angle relative to the seat bracket when the assembly is configured in the ingress/egress configuration. The carriage is at a forwardmost position relative to the pivot bracket when the assembly is configured in the ingress/egress configuration.

The translation of the carriage is orthogonal to the vertical axis of rotation.

The base portion defines an upper-most surface of the assembly.

The base portion is maintained at a constant height relative to the seat bracket as the pivot bracket pivots about the revolute joint and as the carriage translates relative to the pivot bracket along the prismatic joint.

The pivot bracket defines a channel. The carriage comprises one or more rollers. The rollers are disposed in the channel. The one or more rollers are configured to roll along the channel when the carriage translates relative to the pivot bracket. The prismatic joint is defined by the channel and the one or more rollers.

A system is described. The system includes a floor track. The system includes a seat comprising a seat frame coupled to the floor track. The system includes a flight controller. The system includes an assembly. The assembly includes a seat bracket. The assembly includes a pivot bracket. The pivot bracket is coupled to the seat bracket by a revolute joint. The pivot bracket is configured to rotate relative to the seat bracket about the revolute joint. The revolute joint includes a vertical axis of rotation. The assembly includes a carriage comprising a base portion. The carriage is coupled to the pivot bracket by a prismatic joint. The carriage is configured to translate relative to the pivot bracket along the prismatic joint. The assembly includes a link. The link is pivotably coupled between the seat bracket and the carriage. Rotation of the pivot bracket about the revolute joint simultaneously causes rotation of the carriage relative to the seat bracket and translation of the carriage along the prismatic joint. The flight controller is coupled to the carriage.

The assembly and the flight controller are configurable between an in-flight configuration and an ingress/egress configuration.

The carriage and the flight controller are maintained at a constant height relative to the seat bracket as the pivot bracket pivots about the revolute joint and as the carriage and the flight controller translate relative to the pivot bracket along the prismatic joint.

The seat frame is configured to translate longitudinally along the floor track; wherein the assembly and the flight controller are configured to translate longitudinally with the seat frame.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1O depicts a top view of an assembly in an ingress/egress configuration, in accordance with one or more embodiments of the present disclosure.

DETAILED DESCRIPTION OF THE INVENTION

Figure 1A:
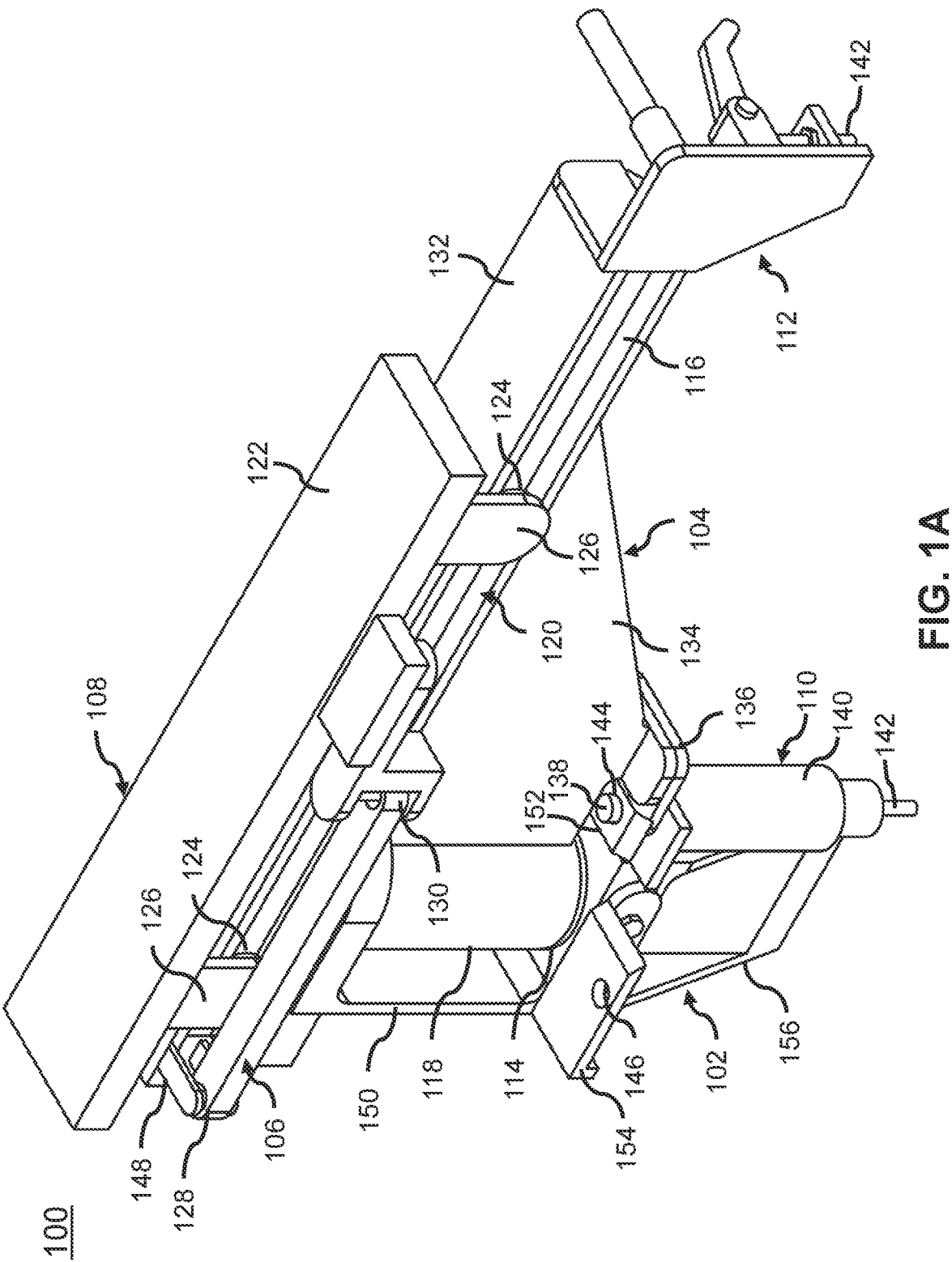
FIG. 1A depicts an isometric view of an assembly in an in-flight configuration, in accordance with one or more embodiments of the present disclosure.
Figure 1B:
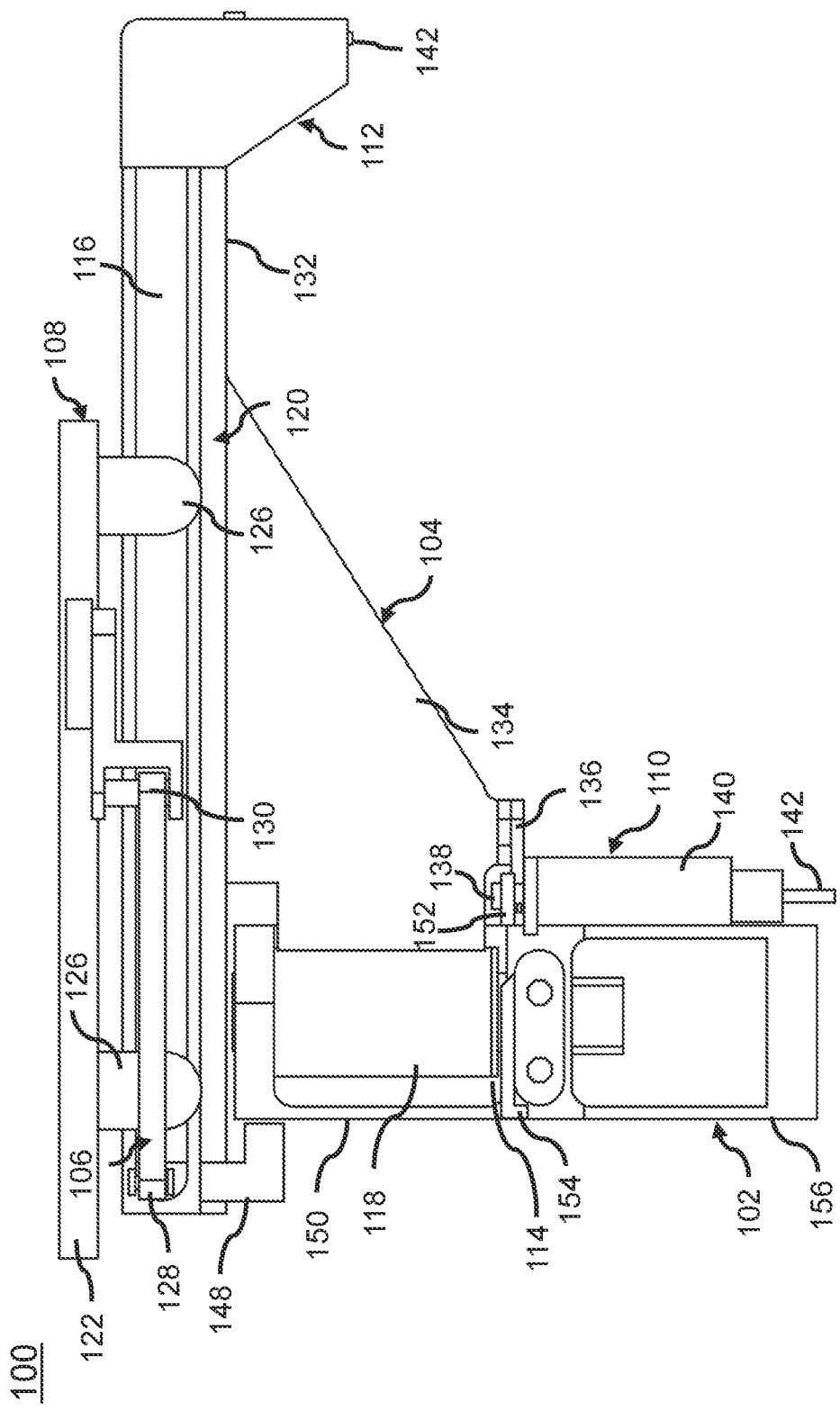
FIG. 1B depicts a side view of an assembly in an in-flight configuration viewed from a door of an aircraft, in accordance with one or more embodiments of the present disclosure.
Figure 1C:
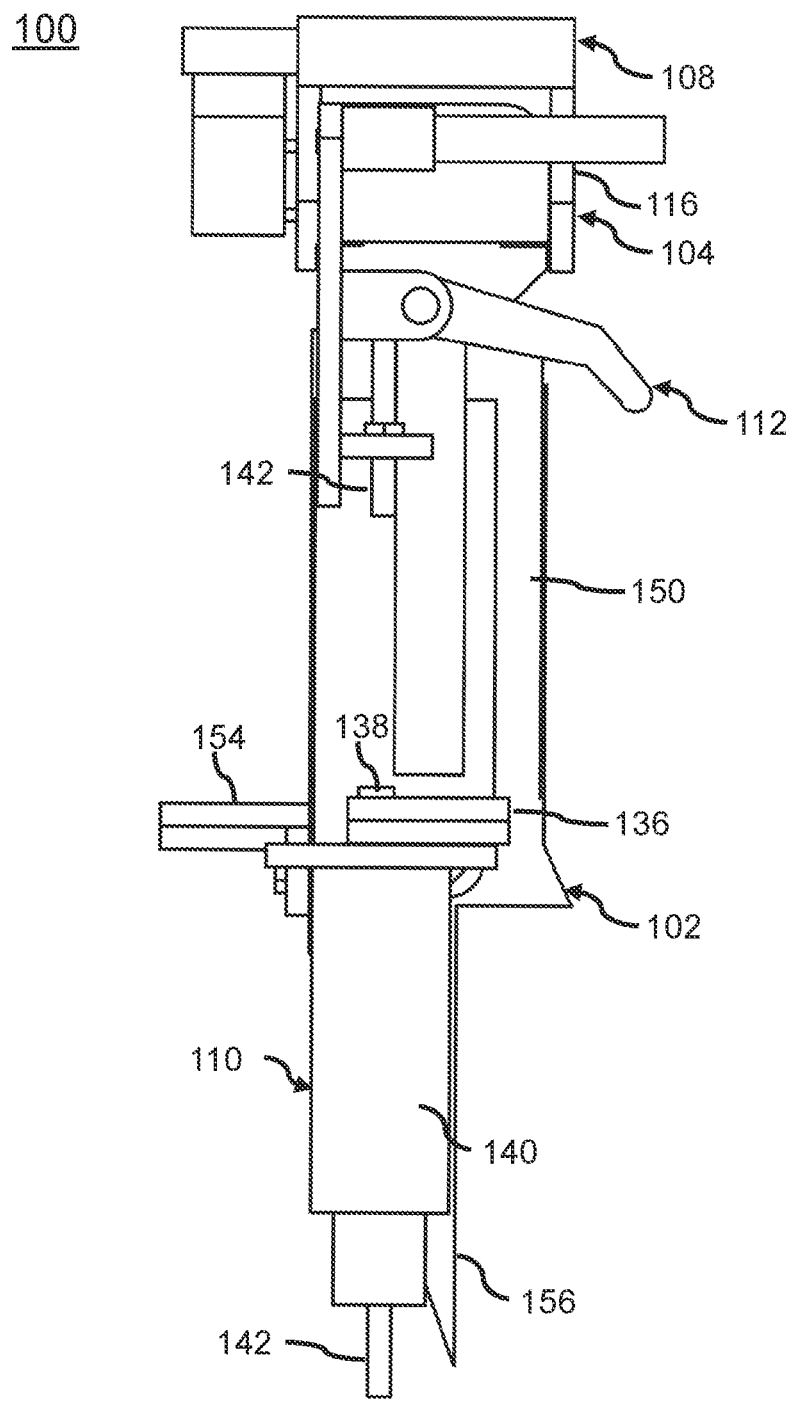
FIG. 1C depicts a front view of an assembly in an in-flight configuration, in accordance with one or more embodiments of the present disclosure.
Figure 1D:
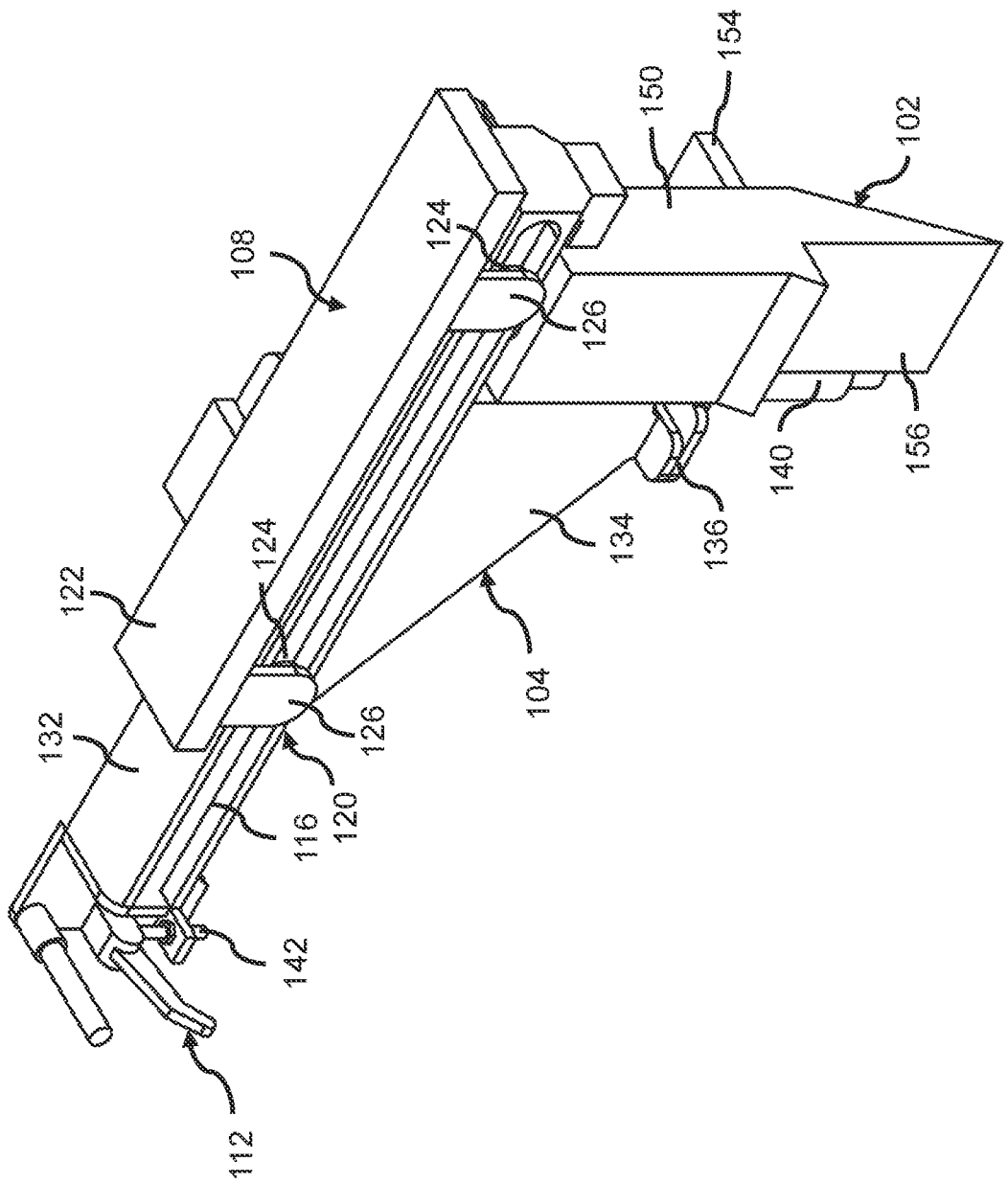
FIG. 1D depicts an isometric view of an assembly in an in-flight configuration viewed from a seat of an aircraft, in accordance with one or more embodiments of the present disclosure.
Figure 1E:
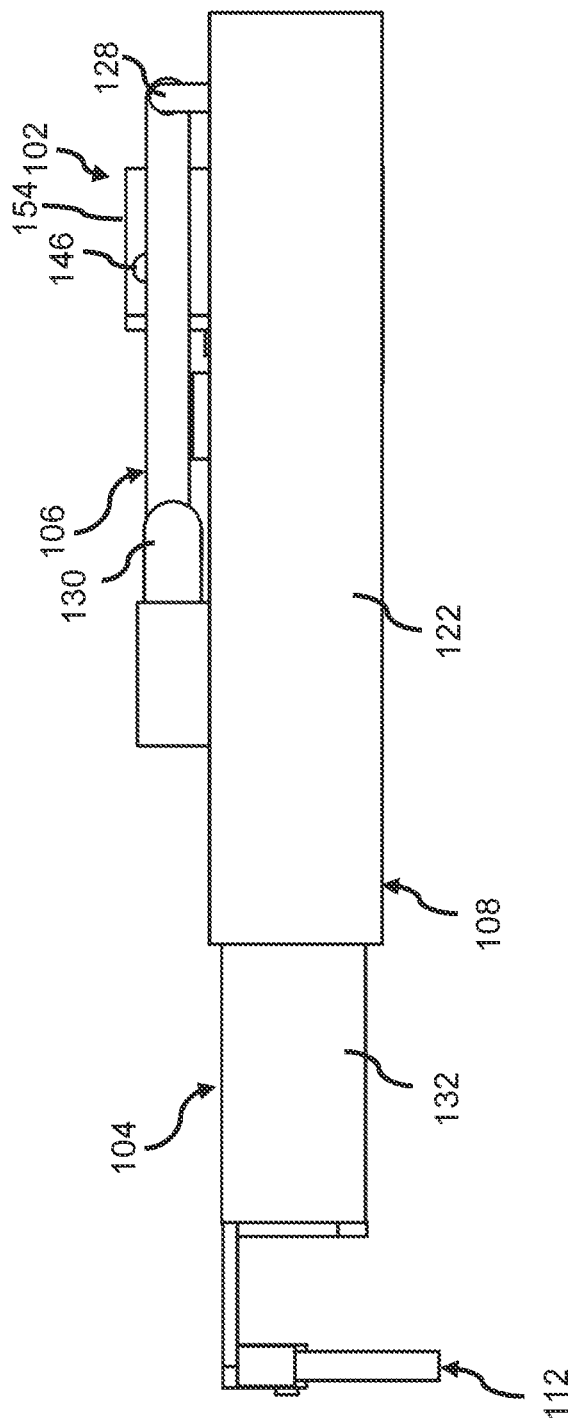
FIG. 1E depicts a top view of an assembly in an in-flight configuration, in accordance with one or more embodiments of the present disclosure.
Figure 1F:
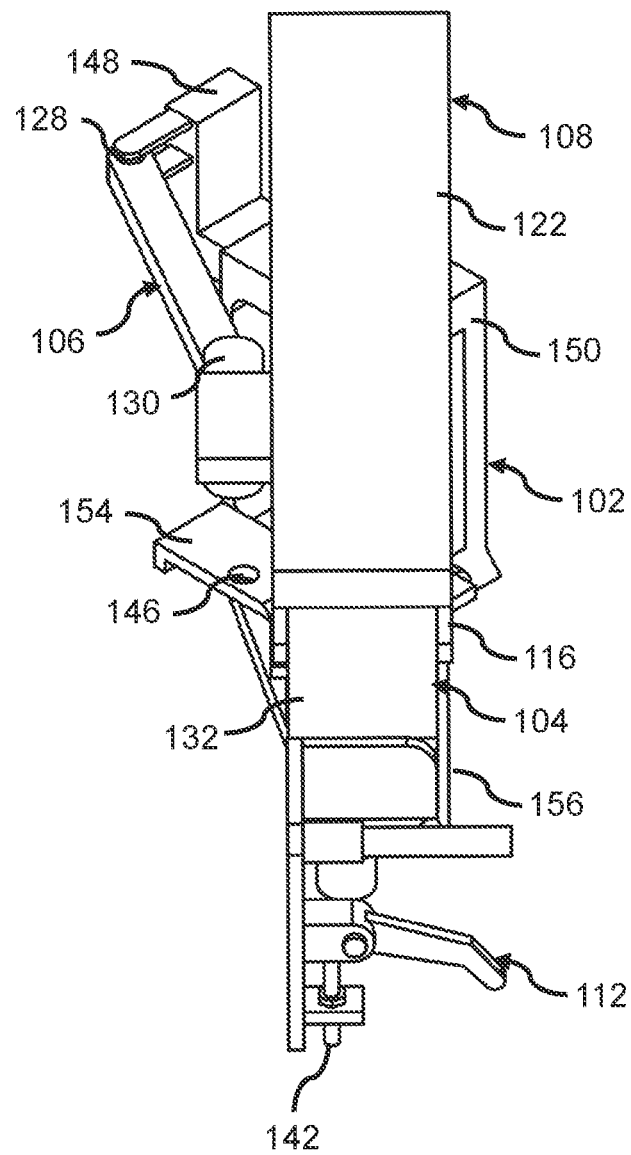
FIG. 1F depicts an isometric view of an assembly in a mid-swing configuration, in accordance with one or more embodiments of the present disclosure.
Figure 1G:
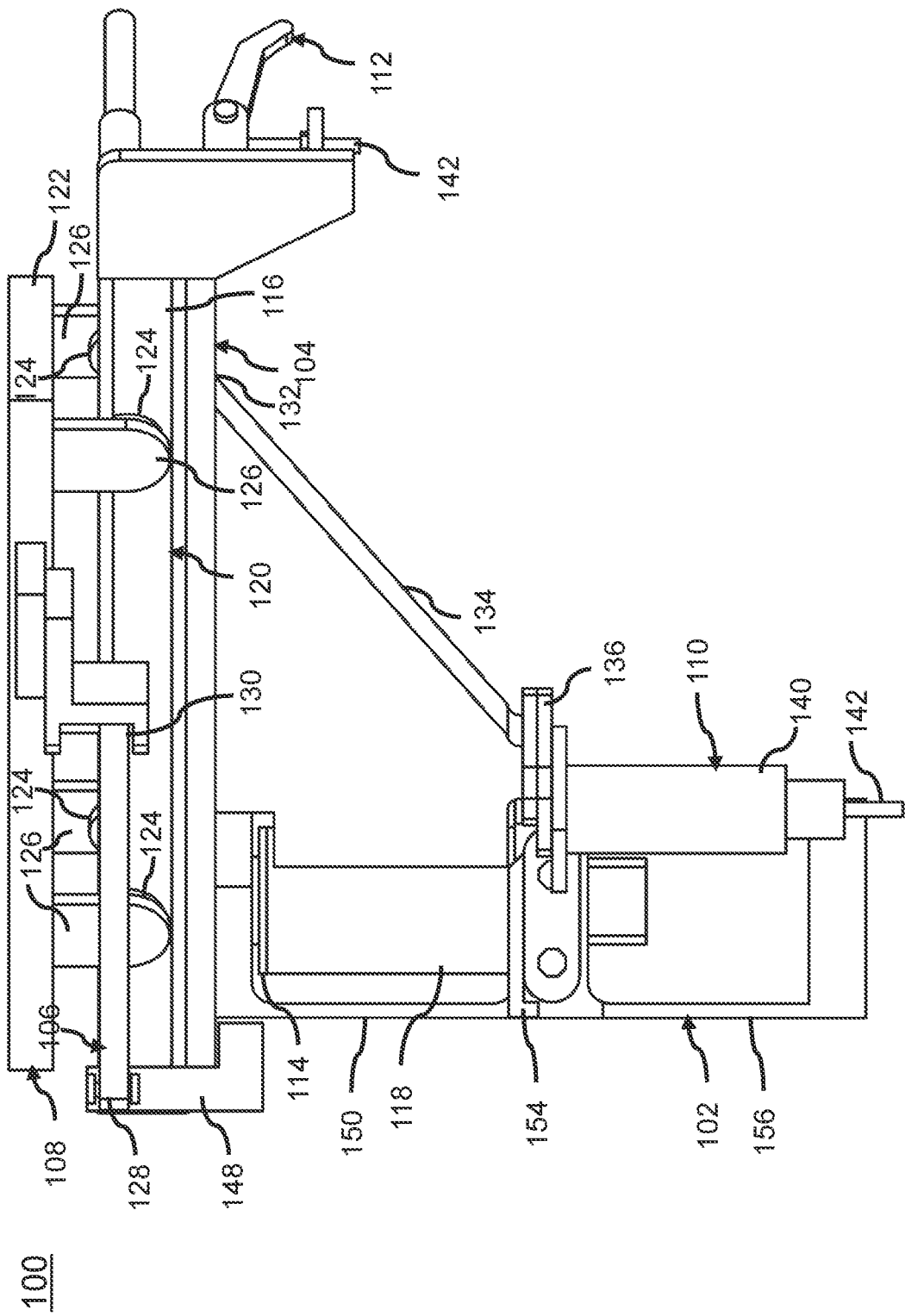
FIG. 1G depicts a side view of an assembly in a mid-swing configuration viewed from a door of an aircraft, in accordance with one or more embodiments of the present disclosure.
Figure 1H:
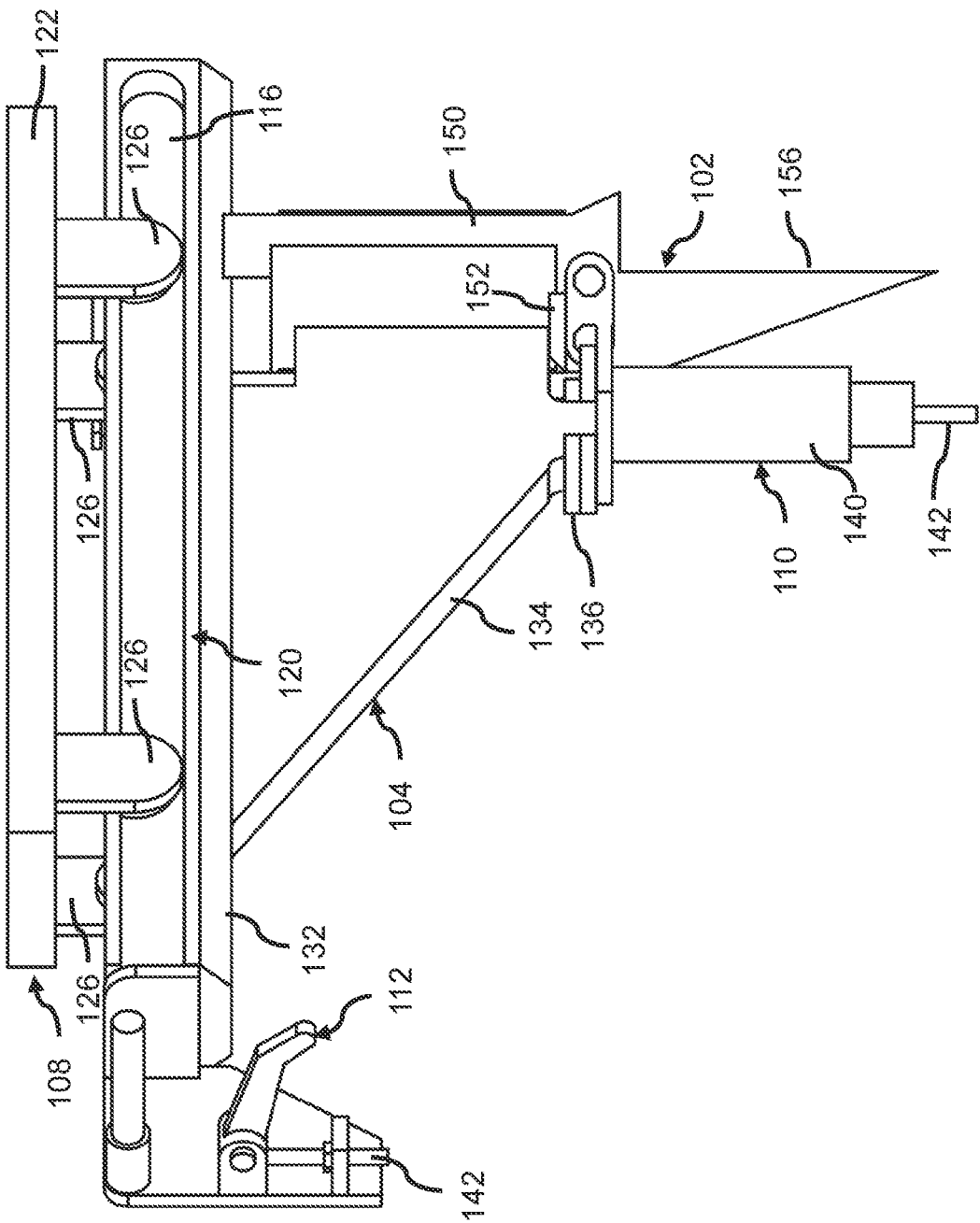
FIG. 1H depicts a front view of an assembly in a mid-swing configuration, in accordance with one or more embodiments of the present disclosure.
Figure 1I:
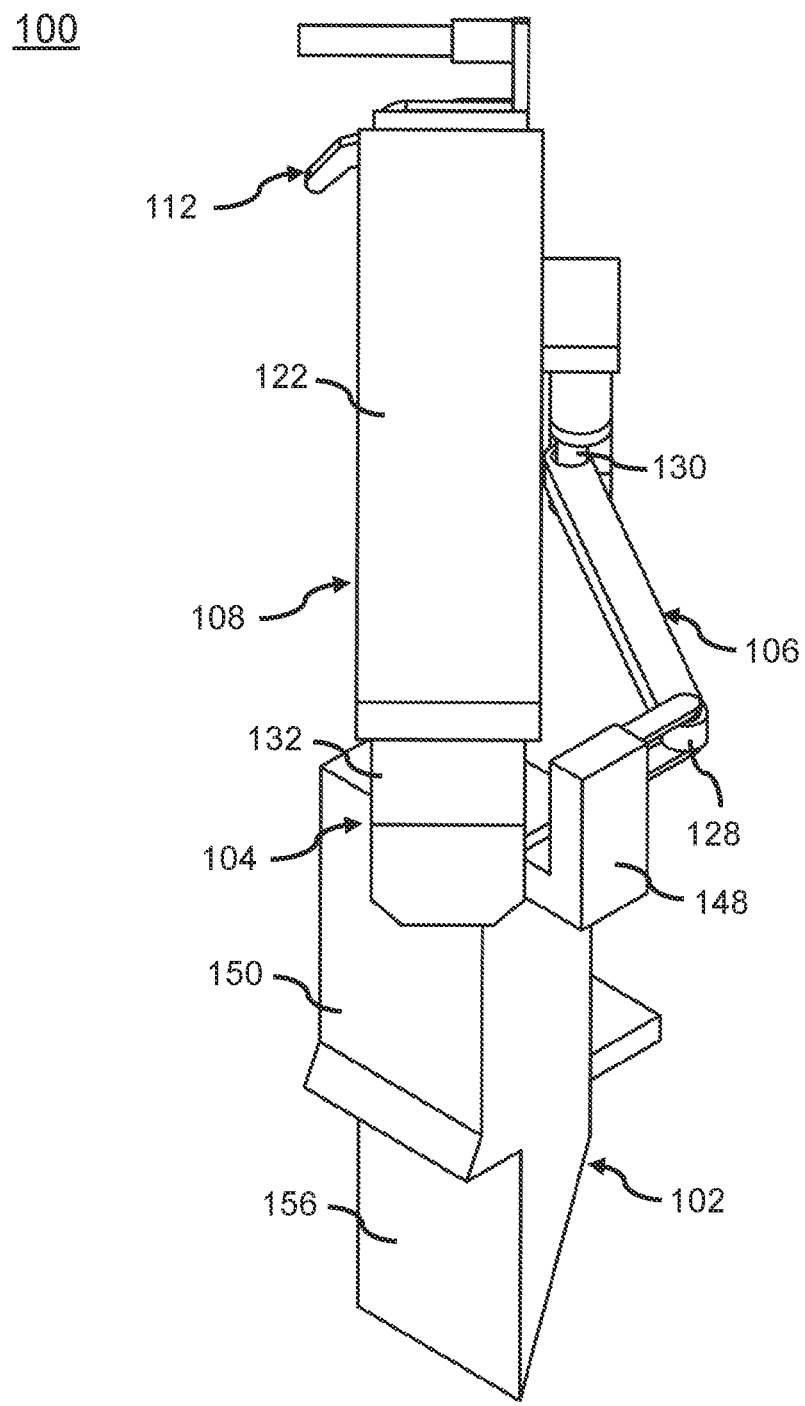
FIG. 1I depicts an isometric view of an assembly in a mid-swing configuration viewed from a seat of an aircraft, in accordance with one or more embodiments of the present disclosure.
Figure 1J:
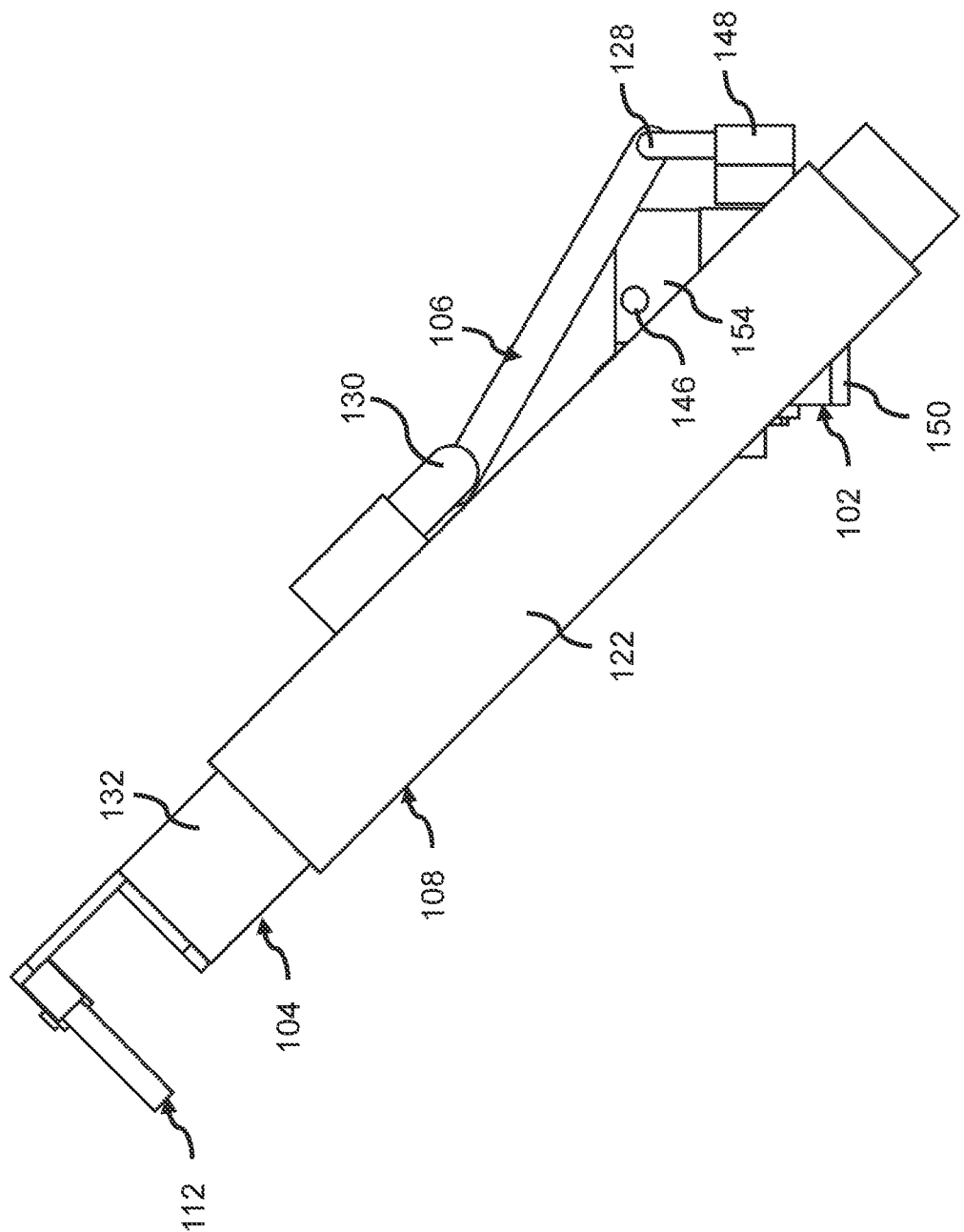
FIG. 1J depicts a top view of an assembly in a mid-swing configuration, in accordance with one or more embodiments of the present disclosure.
Figure 1K:
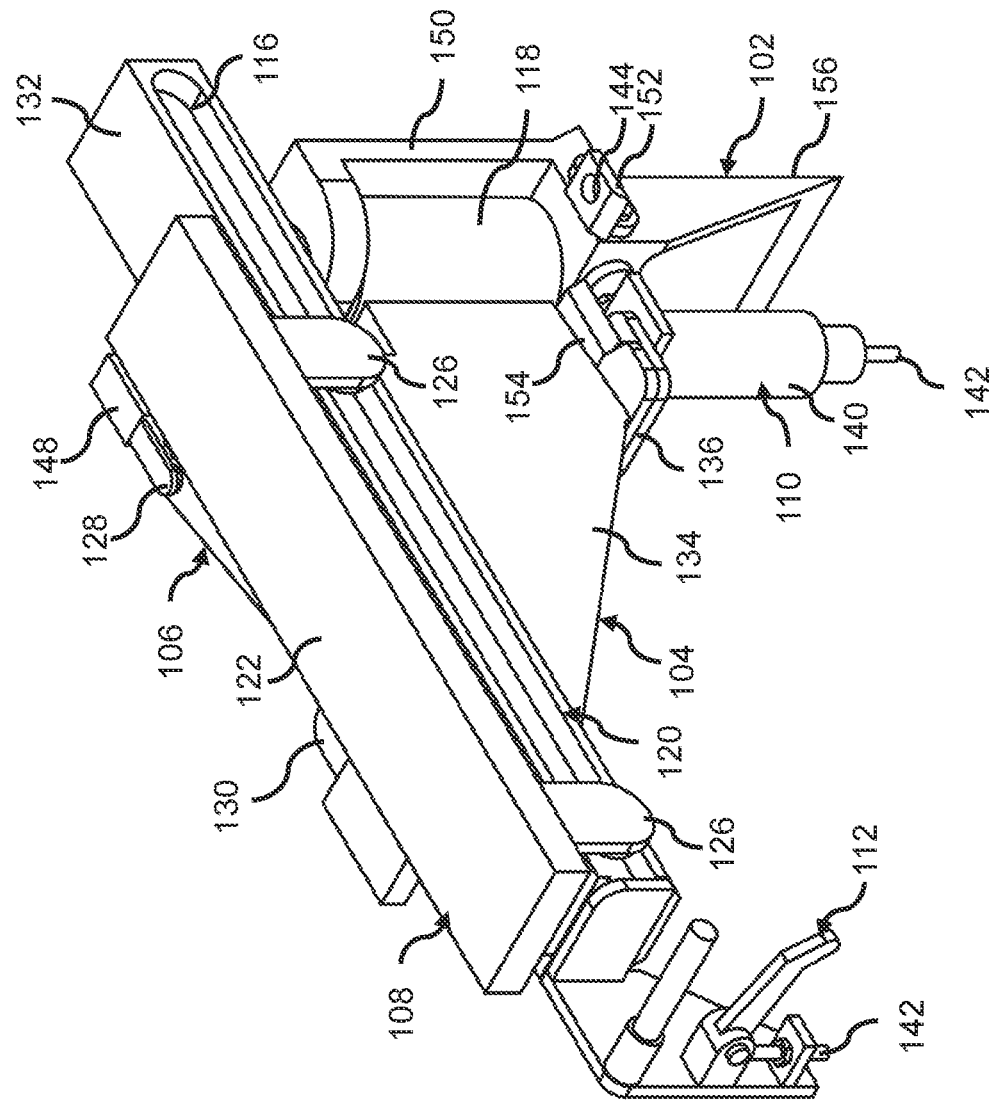
FIG. 1K depicts an isometric view of an assembly in an ingress/egress configuration, in accordance with one or more embodiments of the present disclosure.
Figure 1L:
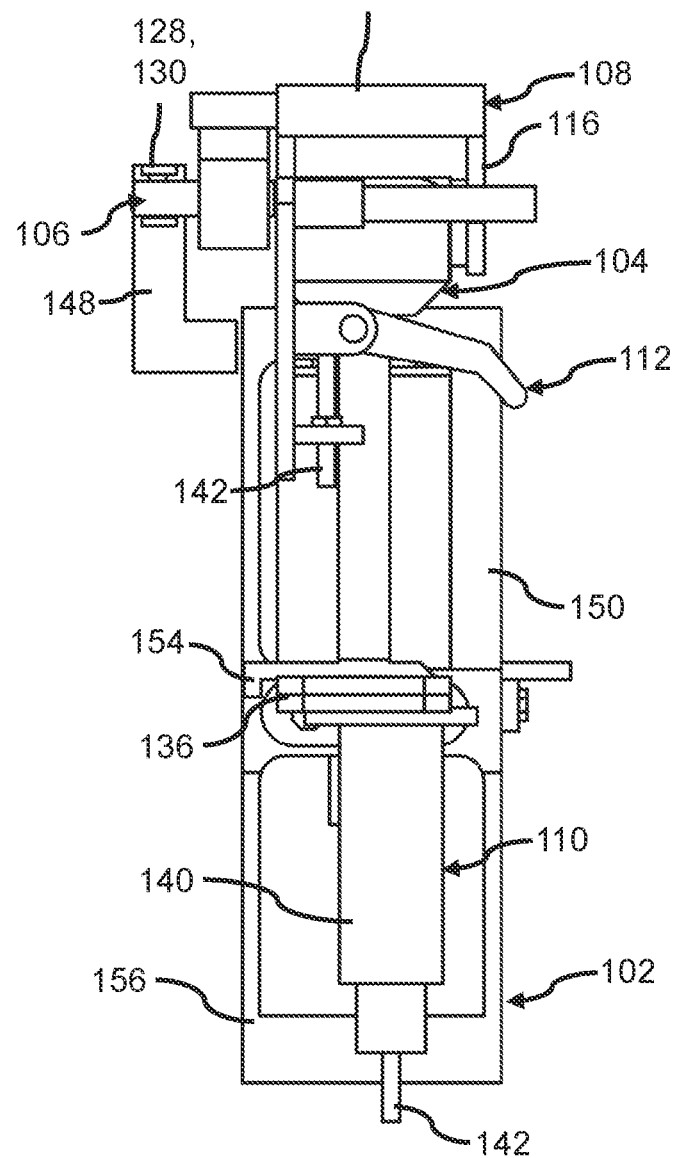
FIG. 1L depicts a side view of an assembly in an ingress/egress configuration viewed from a door of an aircraft, in accordance with one or more embodiments of the present disclosure.
Figure 1M:
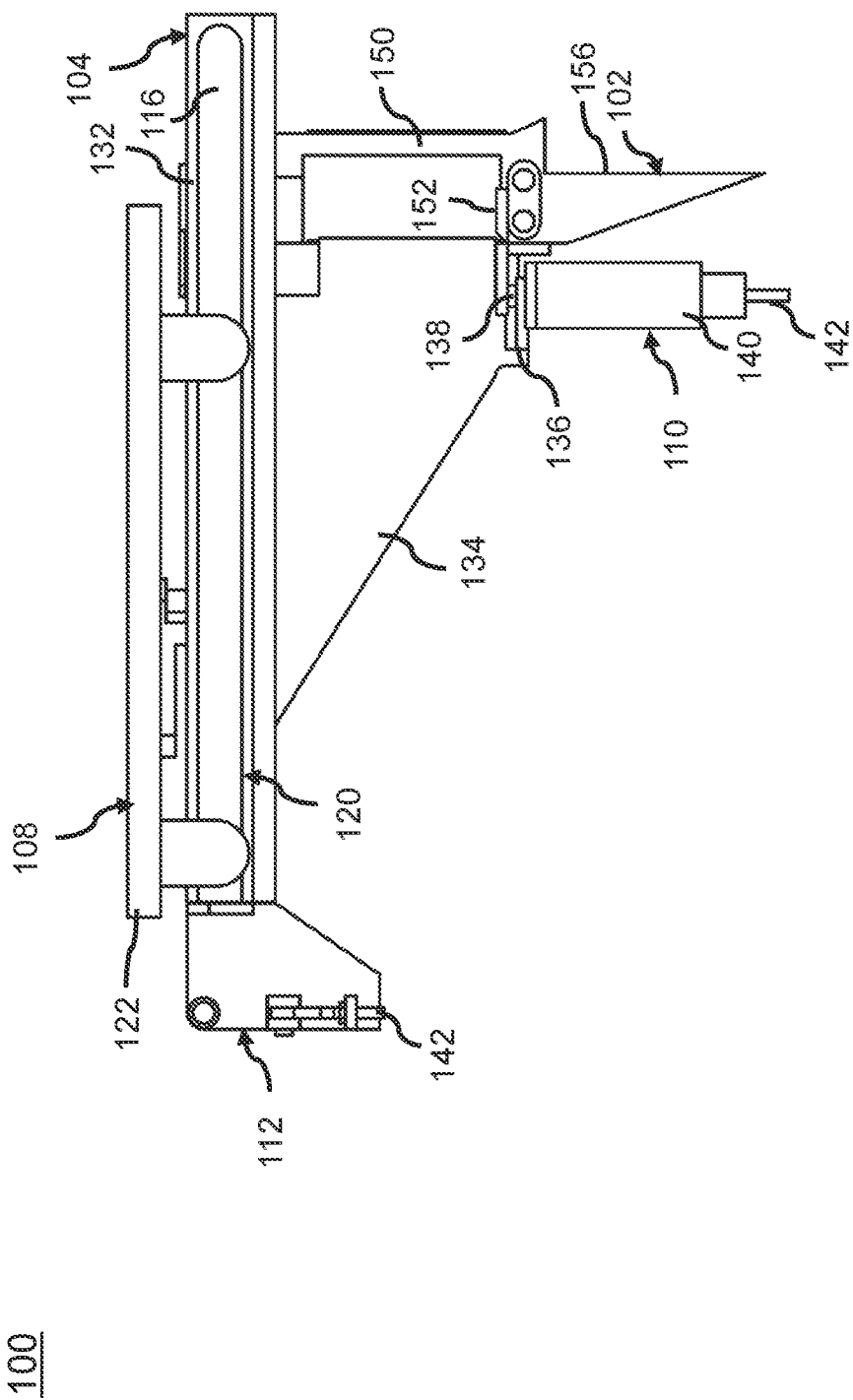
FIG. 1M depicts a front view of an assembly in an ingress/egress configuration, in accordance with one or more embodiments of the present disclosure.
Figure 1N:
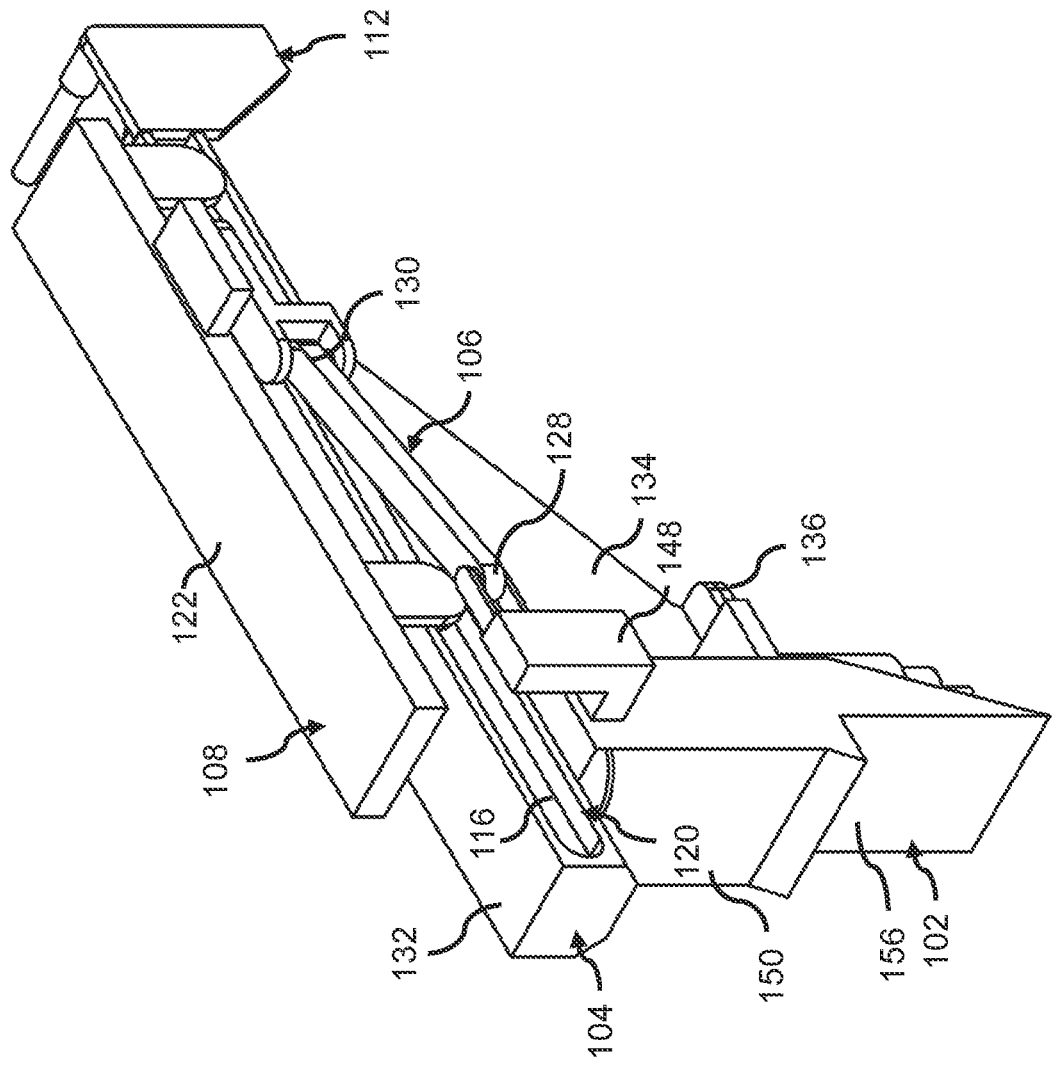
FIG. 1N depicts an isometric view of an assembly in an ingress/egress configuration viewed from a seat of an aircraft, in accordance with one or more embodiments of the present disclosure.
Figure 10:
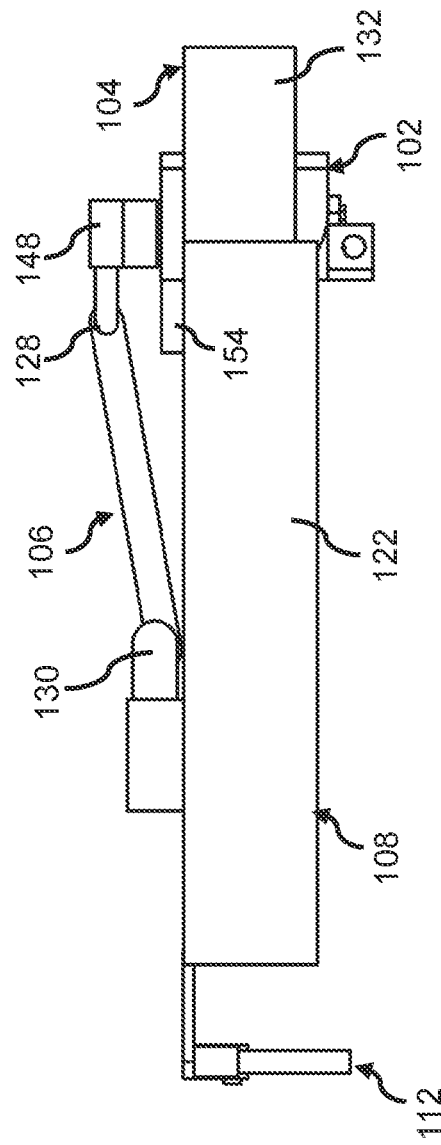
Figure 1P:
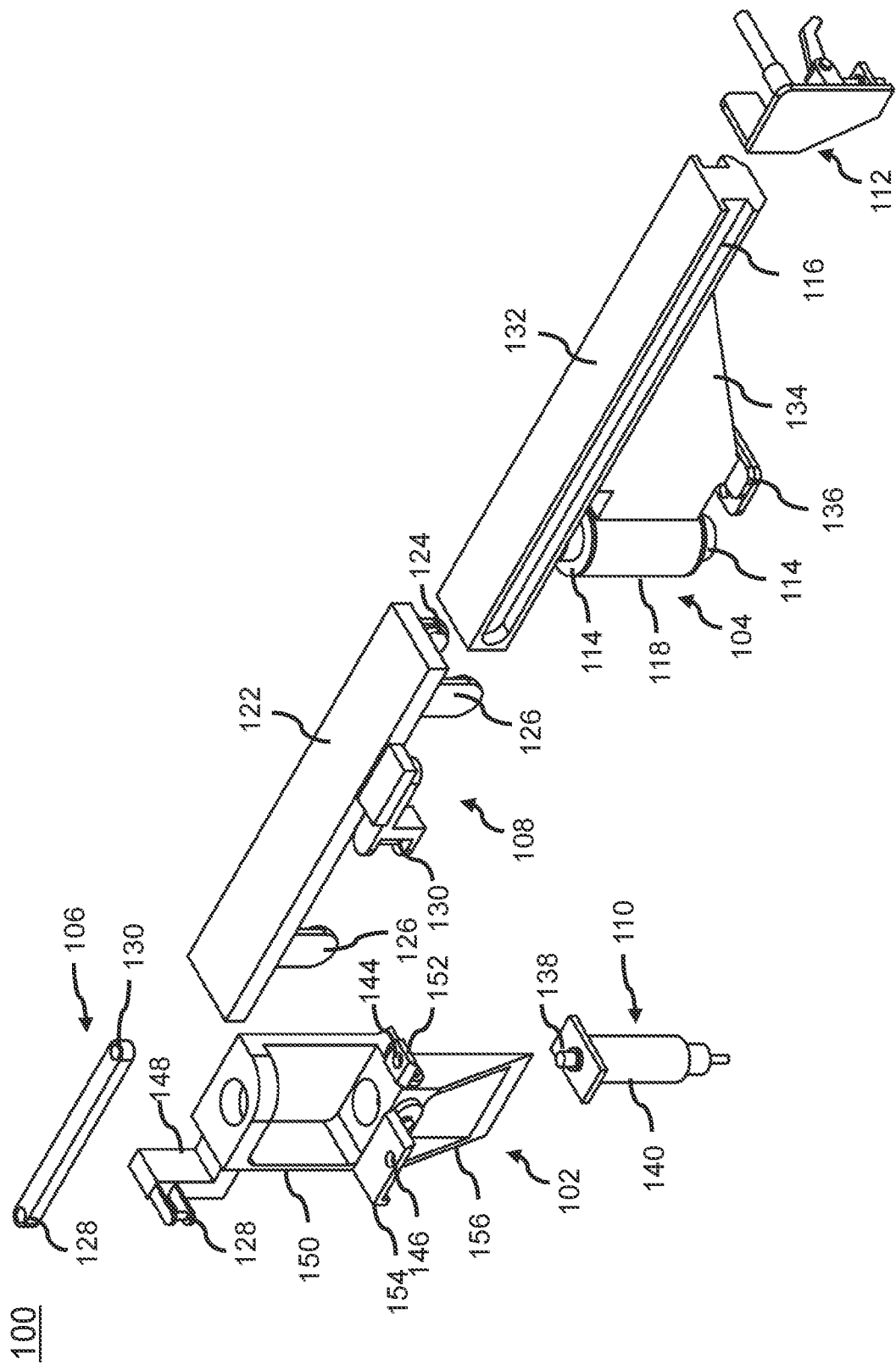
FIG. 1P depicts an exploded view of an assembly, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a flight controller ingress and egress system. The flight controller ingress and egress system is implemented using an assembly. The assembly pivots an outboard flight controller out of the way. The pivoting of the outboard flight controller creates a space for the pilot to be able to ingress and egress through the aircraft door more easily. The assembly improves pilot safety and convenience during ingress and egress from the aircraft.

U.S. Pat. No. 8,052,097, titled "Flying control device for a rotorcraft"; U.S. Pat. No. 11,167,837, titled "Aircraft with outboard throttle quadrant arrangements"; U.S. Pat. No. 9,764,830, titled "Pilot control system with adjustable pedals"; U.S. Pat. No. 9,452,839, titled "Assembly for aircraft cockpit, aircraft cockpit equipped with such assembly and aircraft"; U.S. Pat. No. 11,117,653, titled "System and method for tactile cueing through rotorcraft pilot controls using variable friction and force gradient"; U.S. Pat. No. 4,763,860, titled "Cockpit provided with a lateral control stick adapted to be actuated one-handed and seat for such a cockpit"; U.S. Pat. No. 9,908,614, titled "Crew seat integral inceptor system for aircraft"; U.S. Patent Publication Number 2014/0138492, titled "Integrated seat mounted inceptor"; U.S. Pat. No. 3,580,636, titled "Dual side arm controller"; are incorporated herein by reference in the entirety.

Figure 1Q:
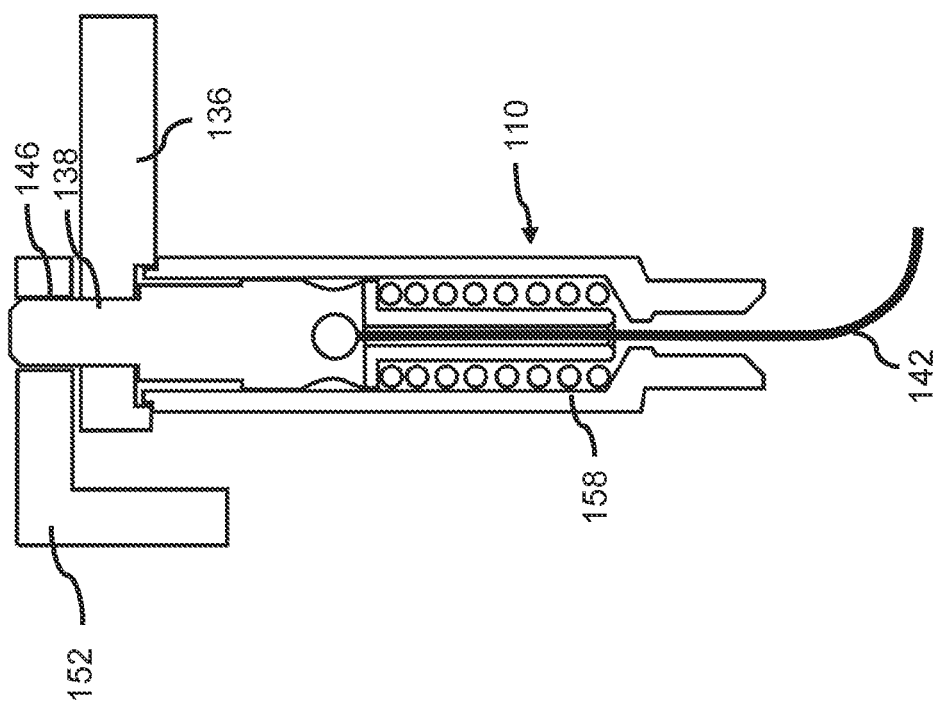
FIG. 1Q depicts a cross-section of a lock assembly, in accordance with one or more embodiments of the present disclosure.

Referring now to FIGS. 1A-1Q, an assembly 100 is described, in accordance with one or more embodiments of the present disclosure. The assembly 100 may include one or more components, such as, but not limited to, a seat bracket 102, a pivot bracket 104, a link 106, a carriage 108, a lock assembly 110, a control lever 112, and the like.

The assembly includes the seat bracket 102. The seat bracket 102 may also be referred to as a seat mounting bracket. The seat bracket 102 is configured to attach to a frame of a seat. In some embodiments, the seat bracket 102 includes one or more portions. The seat bracket 102 includes an upper portion 148. The upper portion 148 includes the revolute joint 128. The seat bracket 102 includes a trunnion portion 150. The trunnion portion 150 may also be referred to as a c-shaped portion. The trunnion portion 150 extends from the upper portion 148. The trunnion portion 150 defines one or more holes. The bushing 114 are receiving within the holes. In this regard, the trunnion portion 150 includes the revolute joint 118.

The seat bracket 102 includes an overhang portion 152. The overhang portion 152 extends from the trunnion portion 150. The overhang portion 152 defines a hole 144. The seat bracket 102 includes an overhang portion 154. The overhang portion 154 extends from the trunnion portion 150. The overhang portion 154 defines a hole 146. The hole 144 and the hole 146 are configured to receive the pin 138.

In some embodiments, the overhang portion 152 and the overhang portion 154 each include a ramped surface. The ramped surface is disposed between the overhang portion 152 and the overhang portion 154. The ramped surface includes a slope. For example, the ramped surface may include a slope of between 30-degrees and 45-degrees. The pin 138 interacts with the ramped surface. The ramped surface strokes the pin 138 downwards, counteracting a compression spring force of the end fitting 140. The ramped surface may also be referred to as a lead in. The ramped surface may be advantageous to not require the control lever 112 to be constantly pulled while changing the configuration of the assembly 100 between the in-flight and ingress/egress configurations. It is further contemplated that the overhang portion 152 and the overhang portion 154 may be a single unitary portion. The pin 138 then rides along a bottom of the single unitary portion between the hole 144 and the hole 146.

The seat bracket 102 includes a lower portion 156. The lower portion 156 extends from the trunnion portion 150. The lower portion 156 defines an I-shaped bracket. The I-shaped bracket is configured to rest on a frame of the seat. The lower portion 156 also includes one or more holes (not depicted) for coupling the seat bracket 102 to the frame of the seat by one or more fasteners (not depicted).

The assembly includes the pivot bracket 104. The pivot bracket 104 may also be referred to as a pivot bracket assembly. In some embodiments, the pivot bracket 104 includes one or more portions. The pivot bracket 104 includes a top portion 132. The top portion 132 defines a channel 116. The pivot bracket 104 includes a middle portion 134. The middle portion 134 extends from the top portion 132. The middle portion 134 defines a tube forming a portion of a revolute joint 118. The middle portion 134 may include a gusseted or triangular shape between the top portion 132 and the revolute joint 118. The pivot bracket 104 may also include one or more ribs (not depicted) between the top portion 132 and the middle portion 134. The pivot bracket 104 includes a bottom portion 136. The bottom portion 136 extends from the middle portion 134. The bottom portion 136 provides a mounting location for coupling the lock assembly 110 to the pivot bracket 104.

The pivot bracket 104 is coupled to the seat bracket 102 by a revolute joint 118. A revolute joint may also be referred to as a pivot point, pivot joint, hinge joint, or the like. In some embodiments, the revolute joint 118 is a trunnion. The revolute joint 118 constrains the motion of the pivot bracket 104 relative to the seat bracket 102. In particular, the pivot bracket 104 is configured to rotate relative to the seat bracket 102 about the revolute joint 118. The revolute joint 118 prevents translation of the pivot bracket 104 relative to the seat bracket 102. Thus, pivot bracket 104 includes one degree-of-freedom relative to the seat bracket 102 by the revolute joint 118. The revolute joint 118 includes a vertical axis of rotation. The vertical axis of rotation may also be referred to as an upright axis. In this regard, the pivot bracket 104 rotates about the revolute joint in a vertical axis of rotation.

In some embodiments, the pivot bracket 104 defines a tube. The tube forms a portion of the revolute joint 118. The revolute joint 118 may include one or more bushings 114 coupled to the tube of the pivot bracket 104. The bushings 114 interface between the pivot bracket 104 and the seat bracket 102 at the pivot joint 118. The bushings 114 carries radial loads. The bushings 114 are formed of a wear material. The bushings 114 reduce wear of the pivot bracket 104 and the seat bracket 102 pivot bracket 104. The bushings 114 include a hardness which is less than the seat bracket 102 and the pivot bracket 104. In this regard, the bushings 114 wear before the seat bracket 102 and the pivot bracket 104. The bushings 114 may be considered a consumable part. The bushings 114 may be decoupled from the pivot bracket 104 and replaced as needed.

The assembly includes the carriage 108. The carriage 108 includes a base portion 122. The base portion 122 is a planar surface. The base portion 122 defines an upper-most surface of the assembly 100. The base portion 122 is configured to couple to a bottom-most surface of an outboard flight controller of an aircraft. The base portion 122 is maintained at a constant height relative to the seat bracket 102 as the pivot bracket 104 pivots about the revolute joint 118 and as the carriage 108 translates relative to the pivot bracket 104 along the prismatic joint 120. The base portion 122 is depicted as being a rectangular-shaped base portion, although this is not intended to be limiting. The base portion 122 may include a shape which is adjusted to provide a suitable coupling location for the outboard flight controller while reducing weight of the carriage 108. In some embodiments, the base portion 122 is dog-bone shaped (not depicted) to provide four mounting locations at the tips of the dog-bone.

The carriage 108 is coupled to the pivot bracket 104 by a prismatic joint 120. The prismatic joint 120 may also be referred to as a slider, a sliding joint or the like. The prismatic joint 120 constrains the carriage 108 to one degree-of-freedom relative to the pivot bracket 104. The one degree-of-freedom is translation of the carriage 108 along the pivot bracket 104. The carriage 108 is prevented from translating in another axis and from rotating relative to the pivot bracket 104. Thus, the carriage 108 is configured to translate relative to the pivot bracket 104 along the prismatic joint 120. The translation of the carriage 108 relative to the pivot bracket 104 is orthogonal to the vertical axis of rotation. In some embodiments, the translation is rectilinear translation. The prismatic joint 120 also cause the carriage 108 to pivot with the pivot bracket 104 as the pivot bracket 104 pivots relative to the seat bracket 102.

In some embodiments, the pivot bracket 104 defines a channel 116. The channel is disposed above the revolute joint 118. The channel 116 extends along a length of the pivot bracket 104.

In some embodiments, the carriage 108 include one or more rollers 124. For example, the carriage 108 is depicted as include four of the rollers 124. In some embodiments, the carriage 108 includes tab portions 126. For example, the carriage 108 is depicted as include four of the tab portions 126. The tab portions 126 extend from the base portion 122. The tab portions 126 couple the rollers 124 to the base portion 122. The rollers 124 are configured to rotate relative to the base portion 122 and rotate relative to the tab portions 126.

The rollers 124 are disposed within the channel 116 of the pivot bracket 104. The rollers 124 are configured to roll along the channel 116 when the carriage 108 translates relative to the pivot bracket 104. The prismatic joint 120 is defined by the rollers 124 and the channel 116. Although the carriage 108 is described as including the rollers 124 and the pivot bracket 104 is described as including the channel 116, this is not intended as a limitation of the present disclosure. It is contemplated that the prismatic joint 120 may include any form of a linear guide mechanism. For example, the prismatic joint 120 may include, but is not limited to, a linear bearing or the like.

The assembly includes the link 106. The link 106 is a fixed-length link. The link 106 connects between the seat bracket 102 and the carriage 108. The link 106 is pivotably coupled to the seat bracket 102 and the carriage 108.

The link 106 is coupled to the seat bracket 102 by a revolute joint 128. The link 106 is coupled to the seat bracket 102 by the revolute joint 128 at a first end of the link 106. The revolute joint 128 constrains the motion of the link 106 relative to the seat bracket 102. In particular, the link 106 is configured to rotate relative to the seat bracket 102 about the revolute joint 128. The revolute joint 128 prevents translation of the link 106 relative to the seat bracket 102.

The link 106 is coupled to the carriage 108 by a revolute joint 130. The link 106 is coupled to the carriage 108 by the revolute joint 128 at a second end of the link 106. In this regard, the revolute joint 128 and the revolute joint 130 are at opposite ends of the link 106. The revolute joint 130 constrains the motion of the carriage 108 relative to the link 106. In particular, the link 106 is configured to rotate relative to the carriage 108 about the revolute joint 130. The revolute joint 130 prevents translation of the link 106 relative to the seat bracket 102.

In some embodiments, the seat bracket 102, the pivot bracket 104, the link 106, and the carriage 108 form a linkage mechanism. The revolute joint 118 and the revolute joint 128 are ground revolute joints of the linkage mechanism. The seat bracket 102 is a ground link of the linkage mechanism. For example, the seat bracket 102 is attached to a frame of an aircraft seat such that the revolute joint 118, the revolute joint 128, and the seat bracket 102 do not move relative to the aircraft seat. The pivot bracket 104 rotates relative to the seat bracket 102 about the revolute joint 118. For example, a pilot may push on the pivot bracket 104 causing the pivot bracket 104 to rotate. The carriage 108 rotates with the pivot bracket 104 as the pivot bracket rotates by the prismatic joint. The link 106 provides translational movement for the carriage 108 along the prismatic while the pivot bracket 104 rotates about the seat bracket 102. The link 106 translates the carriage 108 by virtue of the rotation of the pivot bracket 104. Thus, rotation of the pivot bracket 104 about the revolute joint 118 simultaneously causes rotation of the carriage 108 relative to the seat bracket and translation of the carriage 108 along the prismatic joint 120.

The assembly includes the lock assembly 110. The lock assembly 110 is configured to lock the pivot bracket 104 to the seat bracket 102. For example, the lock assembly 110 locks the pivot bracket 104 to the seat bracket 102 in the in-flight configuration and/or the ingress/egress configuration. The lock assembly 100 locks the pivot bracket 104 at a 0-degrees angle relative to the seat bracket 102 (e.g., when the assembly 100 is configured in an in-flight configuration). The lock assembly 100 locks the pivot bracket 104 at a 90-degrees angle relative to the seat bracket 102 (e.g., when the assembly 100 is configured in an ingress/egress configuration). Locking the pivot bracket 104 to the seat bracket 102 prevents the rotation of the pivot bracket 104 about the revolute joint 118 and the translation of the carriage along the prismatic joint. The lock assembly 110 is configured to unlock the pivot bracket 104 from the seat bracket 102. Unlocking the pivot bracket 104 from the seat bracket 102 allows rotation of the pivot bracket 104 about the revolute joint 118 and the translation of the carriage along the prismatic joint.

In some embodiments, the lock assembly 110 is coupled to the pivot bracket 104. For example, the lock assembly 110 is coupled to the bottom portion 136 of the pivot bracket 104. The lock assembly 110 rotates with the pivot bracket 104 as the pivot bracket 104 rotates about the revolute joint 118.

In some embodiments, the lock assembly 110 includes a pin 138 and an end fitting 140. The end fitting 140 is coupled to the pivot bracket 104. The pin 138 is configured to translate relative to the end fitting 140. The pin 138 is configured to translate downwards relative to the seat bracket 102. Once the pin 138 is translated downwards, the pin 138 is removed from the hole 144 and/or the hole 146. The pin 138 then no longer interfaces with the hole 144 and/or the hole 146. The lock assembly 110 unlocks the pivot bracket 104 from the seat bracket 102 in response to translating the pin 138 downwards. The lock assembly 110 is then unlocked and the pivot bracket 104 is allowed to rotate about the pivot axis in response translating the pin 138 downwards. The pivot bracket 104 is rotated until the assembly 100 is in either the in-flight configuration or the ingress/egress configuration. The pin 138 is inserted through the hole 144 and/or the hole 146. The pin 138 interfaces with the hole, locking the lock assembly 110. The end fitting 140 may include a compression spring (not depicted). The compression spring 158 resides in the end fitting 140 and presses against the pin 138. The compression spring 158 forces the pin 138 upwards. When the cable 142 is pulled, the cable 142 transfers force to the pin 138 compressing the compression spring 158. When tension is removed from the cable 142, the compression spring 158 extends and causes the pin 138 to return to the locked position. For example, the compression spring forces the pin 138 upwards when the control lever 112 is released and tension is removed from the cable 142. In this regard, the pin 138 may also be referred to as a pop pin.

The assembly 100 includes the cable 142. The cable 142 is connected between the lock assembly 110 and the control lever 112. The entire length of the cable 142 is not depicted in the interest of clarity. Only the ends of the cable 142 are shown connected to the lock assembly 110 and the control lever 112. The cable 142 may be housed in a sheath or the like.

The assembly 100 includes the control lever 112. The control lever 112 is coupled to an end of the pivot bracket 104. The control lever 112 is positioned so that the control lever 112 may be accessed from a seated position and from outside the aircraft 100. The cable 142 extends from the control lever 112 to the lock assembly 110. Pulling on the control lever 112 creates tension in the cable 142. The tension in the cable 142 causes the pin 138 to translate downwards and pulls the pin 138 out of the hole 144 and/or the hole 146. The control lever 112 transmits force applied to the control lever 112 through mechanical actuation of the cable 142 to the pin 138. The control lever 112 may also provide a mechanical advantage. Releasing the control lever 112 removes the tension in the cable 142. The end fitting 140 causes the pin 138 to translate upwards relative to the seat bracket 102 when the tension in the cable 142 is removed.

The pivot bracket 104 defines the channel 116 up to the control lever 112. The control lever 112 covers the channel 116 at the end of the pivot bracket 104. Defining the channel 116 up to the control lever 112 may improve in ease-of-assembly of the assembly 100. For example, the rollers 124 are inserted in the channel 116. The control lever 112 is then coupled to the end of the pivot bracket 104. The control lever 112 covers the channel 116, preventing the rollers 124 from leaving the channel 116.

Referring to FIGS. 1A-1E, an example of the assembly 100 is described, in accordance with one or more embodiments of the present disclosure. In this example, the assembly 100 is configured in an in-flight configuration. The pivot bracket 104 and the carriage 108 are at a 0-degree angle relative to the seat bracket 102 when the assembly 100 is configured in the in-flight configuration. The carriage 108 is at a rearmost position relative to the pivot bracket 104 when the assembly 100 is configured in the in-flight configuration.

Referring to FIGS. 1F-1J, an example of the assembly 100 is described, in accordance with one or more embodiments of the present disclosure. In this example, the assembly 100 is configured in a mid-swing configuration. The mid-swing configuration is between the in-flight configuration and an ingress/egress configuration. The pivot bracket 104 and the carriage 108 are at a second angle relative to the seat bracket 102 when the assembly 100 is configured in the mid-swing configuration. The second angle is between a 0-degree angle and a 90-degree angle (e.g., a 45-degree angle as depicted). The carriage 108 is at a middle position relative to the pivot bracket 104 when the assembly 100 is configured in the mid-swing configuration. The middle position is between a rearmost position and a forwardmost position.

Referring to FIGS. 1K-1O, an example of the assembly 100 is described, in accordance with one or more embodiments of the present disclosure. In this example, the assembly 100 is configured in an ingress/egress configuration. The pivot bracket 104 and the carriage 108 are at a 90-degree angle relative to the seat bracket 102 when the assembly 100 is configured in the ingress/egress configuration. The carriage 108 is at a forwardmost position relative to the pivot bracket 104 when the assembly 100 is configured in the ingress/egress configuration.

The assembly 100 is configurable between the in-flight configuration and the ingress/egress configuration. The assembly 100 is configurable between the in-flight configuration and the ingress/egress configuration by the linkage mechanism.

Figure 2A:
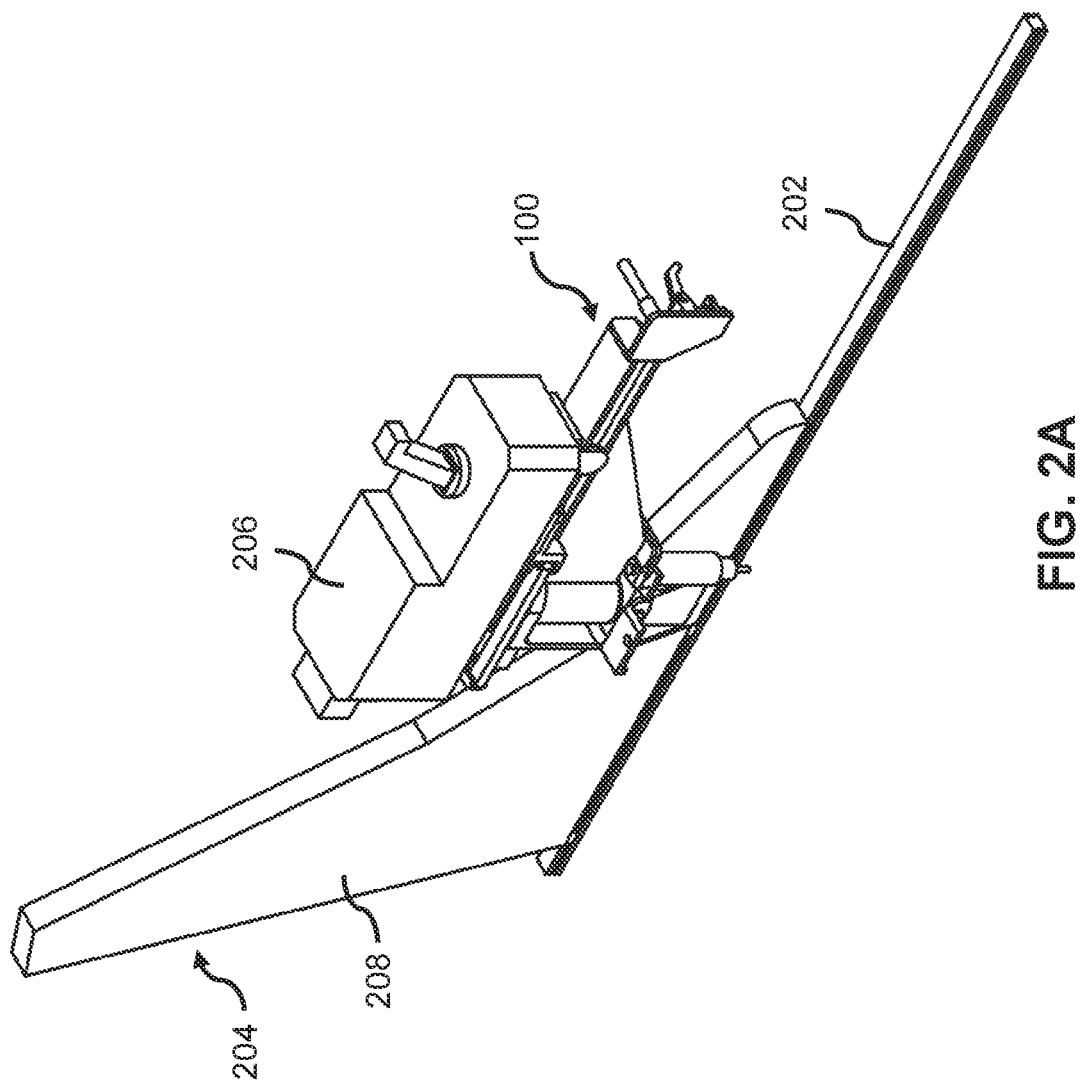
FIG. 2A depicts an isometric view of system including an assembly and an outboard flight controller in an in-flight configuration, in accordance with one or more embodiments of the present disclosure.
Figure 2B:
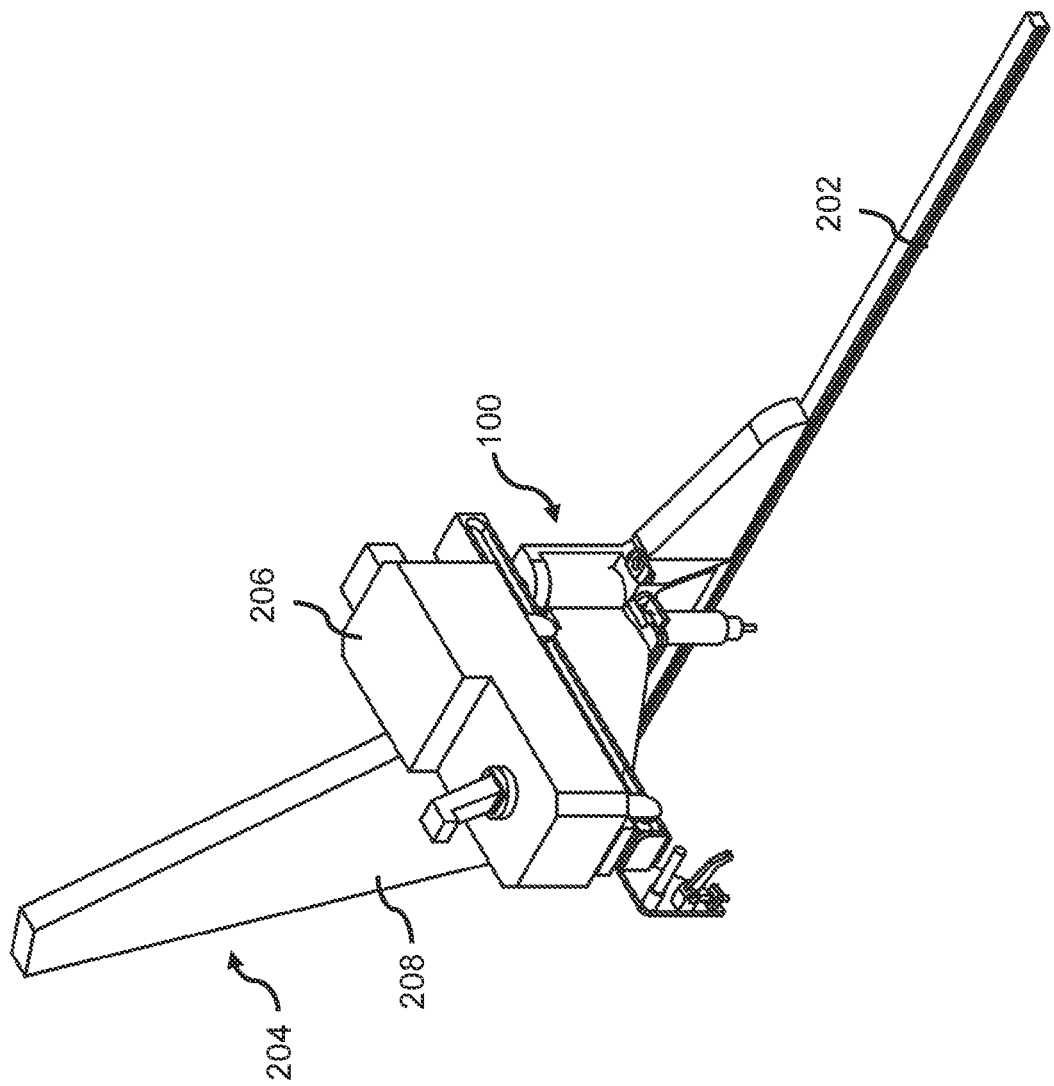
FIG. 2B depicts an isometric view of system including an assembly and an outboard flight controller in an ingress/egress configuration, in accordance with one or more embodiments of the present disclosure.
Figure 2C:
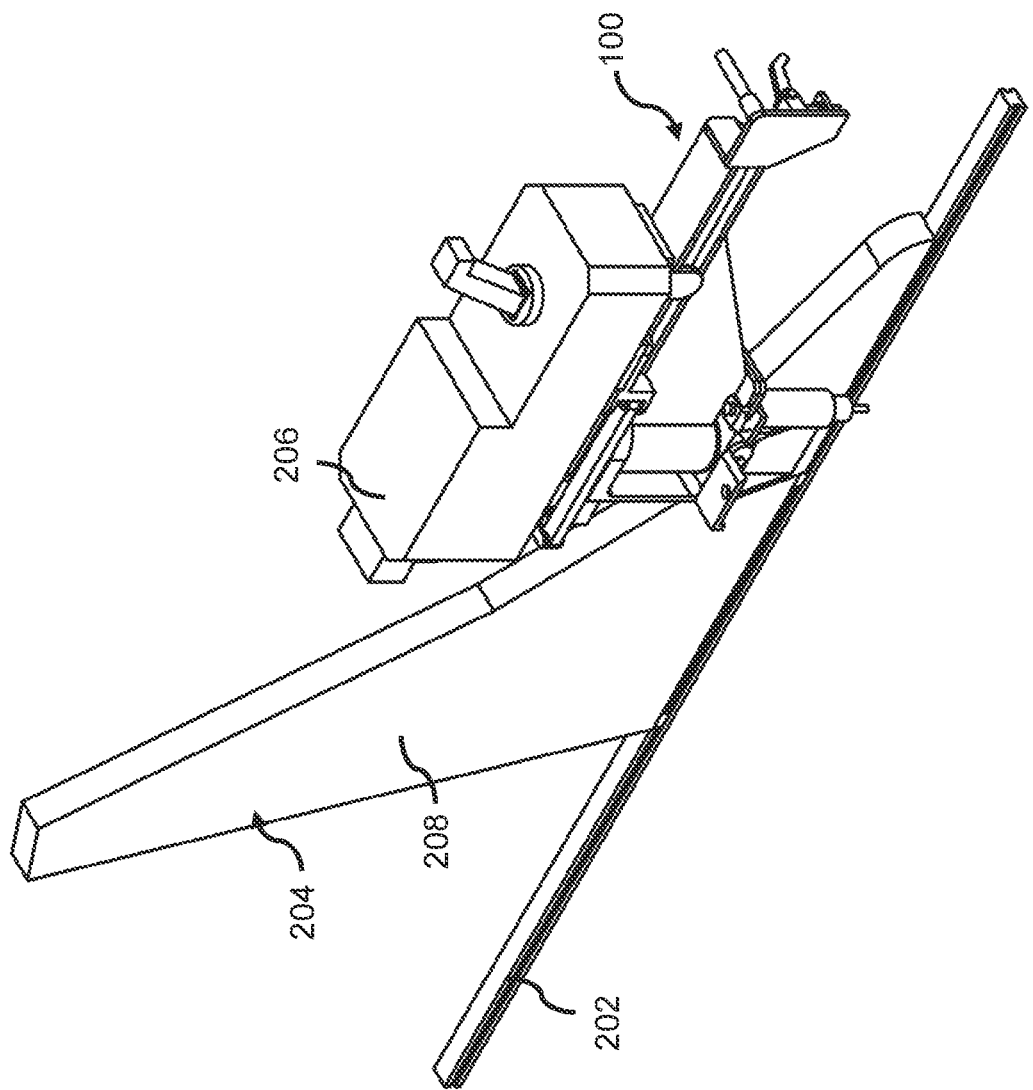
FIG. 2C depicts an isometric view of system including an assembly and an outboard flight controller in an in-flight configuration, where the assembly and outboard flight controller are translated longitudinally with longitudinal translation of a seat frame along a floor track, in accordance with one or more embodiments of the present disclosure.

Referring now to FIGS. 2A-2C, a system 200 is described, in accordance with one or more embodiments of the present disclosure. The system 200 may also be referred to as a flight controller ingress and egress system. The system 200 includes one or more components, such as, but not limited to, the assembly 100, floor track 202, seat 204, flight controller 206, and the like.

The seat 204 includes the floor track 202. The floor track 202 is coupled to a floor of an aircraft. The floor track 202 may include any configuration of floor track, such as, but not limited to, an L-track or the like.

The system 200 includes the seat 204. The seat 204 includes a seat frame 208. The seat frame 208 is coupled to the floor track 202. The seat frame 208 bears the weight of the seat 204 into the seat frame 208. The seat 204 includes one or more additional components which are not depicted, such as, but not limited to, a seat pan, a seat back, and the like.

The system 200 includes the assembly 100. The assembly 100 is coupled to the seat frame 208. For example, the seat bracket 102 is coupled to the seat frame 208. For instance, the lower portion 156 of the seat bracket 102 may rest on the seat frame 208.

The system 200 includes the flight controller 206. The flight controller 206 may also be referred to as an outboard flight controller, an inceptor, or the like. The flight controller 206 is coupled to the assembly 100. For example, the flight controller 206 is coupled to the carriage 108. The flight controller 206 may include a joystick (e.g., a cyclic joystick) or the like.

The assembly 100 and the flight controller 206 are configurable between the in-flight configuration and the ingress/egress configuration. It is contemplated that the ingress/egress configuration may provide up to four times additional room for ingress and egress as compared to the ingress/egress configuration.

The rotation of the carriage 108 causes the flight controller 206 to rotate. The assembly 100 causes the flight controller 206 to rotate about the upright axis of rotation and translate without colliding with the seat frame 208. The translation of the carriage 108 causes the flight controller 206 to translate. For example, the flight controller 206 may rectilinearly translate. The assembly 100 causes the flight controller 206 to rotate about the upright axis of rotation and translate without colliding with the seat frame 208. The simultaneous rotation of the carriage 108 relative to the seat bracket 104 and translation of the carriage 108 along the prismatic joint 120 causes the flight controller to simultaneously rotate and translate with the carriage 108.

The carriage 108 and the flight controller 206 are maintained at a constant height relative to the seat bracket 102 as the pivot bracket 104 pivots about the revolute joint 118 and as the carriage 108 and the flight controller 206 translates relative to the pivot bracket 104 along the prismatic joint 120. In this regard, the flight controller 206 is maintained at a fixed-height in both the in-flight configuration and the ingress/egress configuration.

As depicted, the system 200 is configured as a right-side or a first-officer configuration, although this is not intended as a limitation of the present disclosure. It is further contemplated that the system 200 may be configured as a left-side or captain configuration. For example, the assembly 100 may be mirrored to provide the left-side or captain configuration.

In some embodiments, the seat frame 208 is configured to translate longitudinally (e.g., translate forward and aft) along the floor track 202. By coupling the seat bracket 102 to the seat frame 208, the assembly 100 and the flight controller 206 translate longitudinally with the seat frame 208. The flight controller 206 moves forward and aft with the seat 204. In this regard, the flight controller 206 may always be reachable by a pilot seated on the seat 204 when the seat frame 208 is translated.

In some embodiments, the assembly 100 provides sufficient structural rigidity to ensure the flight controller is maintained in position. A pilot may then access the flight controller to control the flight of the aircraft. In some embodiments, the seat and the assembly is configured to withstand a dynamic load of 35G or greater when the assembly is in the in-flight configuration.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An assembly comprising:
   a seat bracket;
   a pivot bracket, wherein the pivot bracket is coupled to the seat bracket by a revolute joint, wherein the pivot bracket is configured to rotate relative to the seat bracket about the revolute joint, wherein the revolute joint includes a vertical axis of rotation;
   a carriage comprising a base portion, wherein the carriage is coupled to the pivot bracket by a prismatic joint, wherein the carriage is configured to translate relative to the pivot bracket along the prismatic joint; and
   a link, wherein the link is pivotably coupled between the seat bracket and the carriage; wherein rotation of the pivot bracket about the revolute joint simultaneously causes rotation of the carriage relative to the seat bracket and translation of the carriage along the prismatic joint.

2. The assembly of claim 1, comprising a lock assembly; wherein the lock assembly is configured to lock the pivot bracket to the seat bracket; wherein locking the pivot bracket to the seat bracket prevents rotation of the pivot bracket about the revolute joint and the translation of the carriage along the prismatic joint.

3. The assembly of claim 2, wherein the lock assembly is coupled to the pivot bracket; wherein the lock assembly rotates with the pivot bracket as the pivot bracket rotates about the revolute joint.

4. The assembly of claim 3, wherein the lock assembly comprising an end fitting and a pin; wherein the end fitting is coupled to the pivot bracket; wherein the pin is configured to translate relative to the end fitting; wherein the lock assembly unlocks the pivot bracket from the seat bracket in response to translating the pin downwards.

5. The assembly of claim 4, comprising: a cable and a control lever; wherein the cable is coupled between the control lever and the lock assembly; wherein pulling on the control lever creates tension in the cable causing the pin to translate downwards; wherein the end fitting causes the pin to translate upwards relative to the seat bracket when the tension in the cable is removed.

6. The assembly of claim 1, wherein the assembly is configurable between an in-flight configuration and an ingress/egress configuration.

7. The assembly of claim 6, wherein the pivot bracket and the carriage are at a 0-degree angle relative to the seat bracket when the assembly is configured in the in-flight configuration; wherein the carriage is at a rearmost position relative to the pivot bracket when the assembly is configured in the in-flight configuration; wherein the pivot bracket and the carriage are at a 90-degree angle relative to the seat bracket when the assembly is configured in the ingress/egress configuration; wherein the carriage is at a forwardmost position relative to the pivot bracket when the assembly is configured in the ingress/egress configuration.

8. The assembly of claim 1, wherein the translation of the carriage is orthogonal to the vertical axis of rotation.

9. The assembly of claim 1, wherein the base portion defines an upper-most surface of the assembly.

10. The assembly of claim 1, wherein the base portion is maintained at a constant height relative to the seat bracket as the pivot bracket pivots about the revolute joint and as the carriage translates relative to the pivot bracket along the prismatic joint.

11. The assembly of claim 1, wherein the pivot bracket defines a channel; wherein the carriage comprises one or more rollers; wherein the rollers are disposed in the channel; wherein the one or more rollers are configured to roll along the channel when the carriage translates relative to the pivot bracket; wherein the prismatic joint is defined by the channel and the one or more rollers.

12. A system comprising:
    a floor track;
    a seat comprising a seat frame coupled to the floor track;
    a flight controller; and
    an assembly including:
      a seat bracket;
      a pivot bracket, wherein the pivot bracket is coupled to the seat bracket by a revolute joint, wherein the pivot bracket is configured to rotate relative to the seat bracket about the revolute joint, wherein the revolute joint includes a vertical axis of rotation;
      a carriage comprising a base portion, wherein the carriage is coupled to the pivot bracket by a prismatic joint, wherein the carriage is configured to translate relative to the pivot bracket along the prismatic joint; and
      a link, wherein the link is pivotably coupled between the seat bracket and the carriage; wherein rotation of the pivot bracket about the revolute joint simultaneously causes rotation of the carriage relative to the seat bracket and translation of the carriage along the prismatic joint; and
    wherein the flight controller is coupled to the carriage.

13. The system of claim 12, wherein the assembly and the flight controller are configurable between an in-flight configuration and an ingress/egress configuration.

14. The system of claim 12, wherein the carriage and the flight controller are maintained at a constant height relative to the seat bracket as the pivot bracket pivots about the revolute joint and as the carriage and the flight controller translate relative to the pivot bracket along the prismatic joint.

15. The system of claim 12, wherein the seat frame is configured to translate longitudinally along the floor track; wherein the assembly and the flight controller are configured to translate longitudinally with the seat frame.

\* \* \* \* \*